Jan. 1, 1952  B. E. PREVOST  2,581,289
DISK NOZZLE SHOWER DEVICE
Filed Feb. 9, 1949
*Fig. 1.*
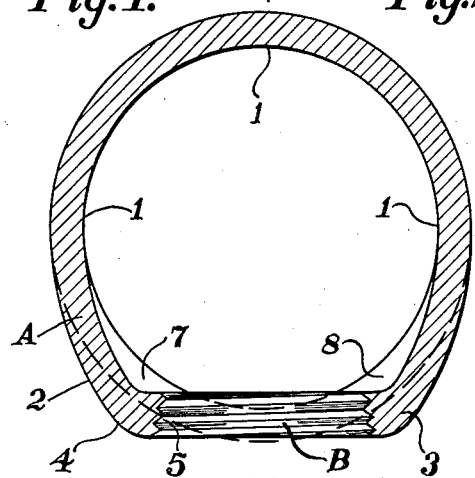
*Fig. 2.*
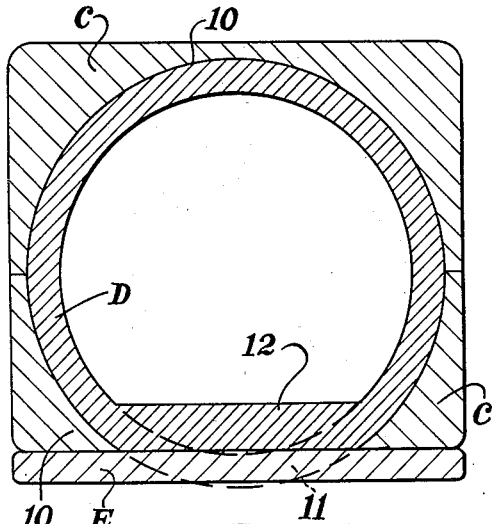
*Fig. 3.*
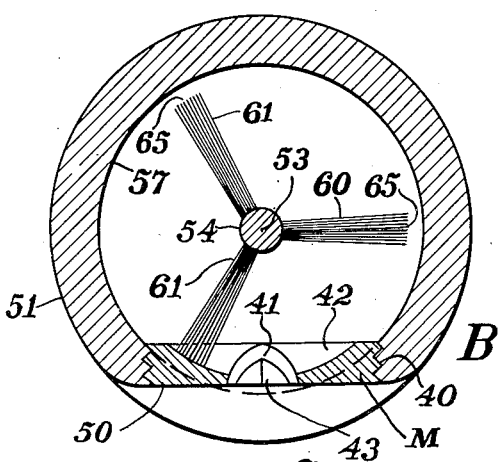
*Fig. 4.*
*Fig. 6.*
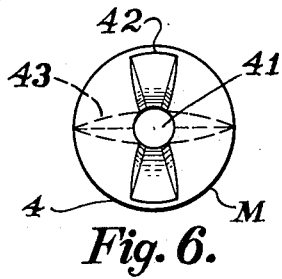
*Fig. 5.*
Bruno E. Prevost, INVENTOR.
BY
Pearson + Pearson
ATTORNEYS Patented Jan. 1, 1952

2,581,289

UNITED STATES PATENT OFFICE 2,581,289

DISK NOZZLE SHOWER DEVICE

Bruno E. Prevost, North Andover, Mass., assignor to John W. Bolton & Sons, Inc., Lawrence, Mass., a corporation of Massachusetts Application February 9, 1949, Serial No. 75,410

6 Claims. (Cl. 299—104)

This invention relates to shower pipes of the type in which a thin circular disc is secured within a wall of the pipe to act as a nozzle in producing fan-shaped or other sprays.

The principal object of my invention is to secure more area of contact between the edges of the nozzle and the edges of the opening in the wall of the pipe. A further object is to achieve this end without so flattening a portion of the pipe that a bulge is formed therein. A still further object is to permit the use of the same diameter of nozzle not only in pipes of comparatively large cross section, but also in pipes of a cross sectional diameter that is only slightly larger than the diameter of the nozzle.

I am aware that it has been proposed to insert the stem of a nozzle in an opening in the wall of a pipe by indenting the surface of the pipe in a press. This is objectionable however, because when one part of the pipe wall is pressed inward to make a flat surface, the surrounding pipe bulges outwardly thus causing a pocket inside the pipe at the flat portion and a bulge on the outside of the pipe. In the paper industry, splash guards are often carried by brackets slidable onto and along the shower pipe so that a bulge in the pipe causes an unwanted obstruction.

The flat portion of my shower pipe is obtained by holding the pipe in a form which hugs the outside of the pipe with a tight grip over the entire surface that is to remain circular. I then force the balance of the pipe wall surface inwardly so that it becomes a chord of the circumference of the pipe without any bulge. With pipes of flowable metal, my process of flatening the pipe wall also causes the metal to thicken, where it has been forced inward, which is desirable to give even more contacting surface for the threads of the nozzle.

My invention is particularly useful with the disc type nozzles shown in patent to Witham and Walsh, No. 1,972,001, dated August 28, 1934, in which there is a central orifice and grooves on either side at right angles to each other. The inside groove is used for keeping the orifice clear of foreign matter usually by a revolving or reciprocating brush which passes through the groove as it is manually or automatically actuated.

In the flattened pipes of my new construction, not only do the threads of the nozzle contact all of the threads in the aperture of the pipe wall but also the interior groove of the nozzle is moved inwardly towards the centre of the pipe. I can thus rotate or reciprocate a brush around the usual central shaft in the pipe so that it will touch only the inside nozzle groove and not the inner wall surface of the pipe. Sediment caught up on the tips of the bristles is thus washed off by the shower liquid as it passes along the pipe rather than trapped between the tips of the bristles and the inner wall surface of the pipe. Wear on the tips of the bristles is also reduced, because of less frictional contact.

With pipes flattened according to my invention, I can use nozzles of a diameter nearly equal to the outside diameter of the pipe, but prefer to have such nozzles no greater in diameter than the inside diameter of the pipe. I find that in securing disc type nozzles, either by threading, welding or similar suitable methods, in a chord of the cross section of a pipe no detrimental pockets are formed and the flow of liquid and the spray produced, are much more efficient than in previous methods.

In the drawings, Fig. 1 is a cross section of an old method of flattening a shower pipe for the insertion of a nozzle.

Fig. 2 is a similar view of my new shower pipe with the flat portion forming a chord.

Fig. 3 is a cross section of a shower pipe of my new construction, showing that the nozzle diameter can nearly equal the outside pipe diameter.

Fig. 4 is a similar view illustrating the old method of inserting disc nozzles in circular pipes and illustrating the lack of contact of the threads of the nozzle with the threads of the aperture.

Fig. 5 is a cross sectional view of my new pipe with a nozzle of the Walsh-Witham type secured therein and showing the new relation of the cleaning groove with the clean-out brush.

Fig. 6 is a plan view of the Walsh-Witham nozzle that I prefer to use in my invention.

As shown in Fig. 1, A is a shower pipe partly of circular cross section as at 1 and bulging outwardly at 2 and 3 to form a flattened portion at 4. A nozzle B is threadedly secured in an opening 5 in 4. The bulges at 2 and 3 are objectionable in that they form turbulence pockets at 7 and 8 which may adversely affect the flow of liquid through the pipe. In addition the bulges 2 and 3, when formed in a long pipe with many nozzles, form an obstruction to any sliding brackets carried on the exterior of the pipe for the support of splash guards.

In my new shower pipe there are no bulges similar to 2 and 3. As shown in Fig. 2, I provide a form C having a circular cavity 10 of sufficient depth to hold that portion of a pipe D that is to remain circular in cross section. A pressure member E is then applied to the pipe D to force the portion of the pipe wall shown in dotted lines at 11 inwardly into the chord position shown at 12 without distortion to the remainder of the pipe. The flowable metal used, such as copper, tends to thicken slightly at 12, since the chord 12 is shorter than the arc 11 and I therefore secure a slight increase in thread contacting surface of great advantage in thin walled pipes.

The present method of inserting disc type nozzles in circular shower pipes is shown in Fig. 4 in which a pipe F, of circular cross section, has a circular threaded opening 20 in the pipe wall. A nozzle N when threaded into hole 20 is partly out of contact with the threads of the opening, as at 21, and therefore is weakly secured. Of course, a nozzle of larger diameter such as shown in dotted lines at 22, would be so far out of contact with the circular pipe wall that liquid would leak around the edges thereof.

It will be apparent that the flat chord of my new pipe, shown in Figs. 2, 3 and 5 will accommodate disc type nozzles of a diameter nearly equal to the outside length of the chord, without any leaking around the edges and with the entire nozzle thread in contact with the entire aperture thread for 360°.

In Fig. 3, I show a pipe G of comparatively small diameter and thick walls to illustrate how a nozzle N nearly equal in diameter to the outside diameter of the pipe G can be inserted in a chord 31 of the pipe according to my invention. I may flatten the entire length of the shower pipe as shown in Fig. 2 or may only flatten that portion which contains the nozzle as shown in Fig. 3, leaving the remainder of the pipe circular as at 30.

A nozzle M of the Walsh-Witham type is shown in Figs. 5 and 6 having exterior threads at 40, a central orifice at 41, an inside groove at 42 and an outside groove 43 at right angles to 42. By inserting such a nozzle in a chord 50 of a circular pipe 51, the groove 42 is moved inwardly toward the centre 53 of the pipe.

It is customary to use a revolving or reciprocating clean-out brush 60 having tufts of bristles 61 to clean sediment out of groove 42 and orifice 41 as it is moved either clockwise or counter-clockwise on a central shaft 54. In shower pipes of my new construction, the tips 65 of the bristles can be spaced inwardly from the interior wall surface 57 of pipe 51, thus preventing frictional wear and still enabling the tip 65 to clean groove 42. The sediment picked up on tips 65 is cleared therefrom when the brush is out of the groove by the flow of liquid in the pipe past the tips of the bristles.

I claim:

1. A shower for use in a paper mill comprising; a pipe having a cross section, the major portion of which is circular and the minor portion of which is a chord of the circle, said pipe being provided with a plurality of threaded circular openings spaced longitudinally along the chord portion, and a nozzle threaded in each opening comprising a thin circular disc provided with a central discharge orifice of substantial size and two angularly disposed grooves, one on the inside and one on the outside of said disc, intersecting said orifice.

2. A shower for use in a paper mill comprising; a pipe having a cross section, the major portion of which is circular and the minor portion of which is a chord of the circle, said pipe being provided with a plurality of threaded circular openings spaced longitudinally along the chord portion, and a nozzle threaded in each opening comprising a thin circular disc provided with a central discharge orifice of substantial size and two angularly disposed grooves, one on the inside and one on the outside of said disc, intersecting said orifice, the inner and outer surface of each nozzle being flush with the inner and outer surface of the chord portion of said pipe.

3. A shower for use in a paper mill comprising; a pipe having a cross section, the major portion of which is circular and the minor portion of which is a chord of the circle, said pipe being provided with a plurality of threaded circular openings spaced longitudinally along the chord portion, and a nozzle threaded in each opening comprising a thin circular disc provided with a central discharge orifice of substantial size and two angularly disposed grooves, one on the inside and one on the outside of said disc, intersecting said orifice, and a clean-out brush pivotally mounted in the centre of said pipe with the tips of the tufts thereof in contact with the inside groove of the disc.

4. A shower for use in a paper mill comprising; a pipe having a cross section, the major portion of which is circular and the minor portion of which is a chord of the circle, said pipe being provided with a plurality of threaded circular openings spaced longitudinally along the chord portion, and a nozzle threaded in each opening comprising a thin circular disc provided with a central discharge orifice of substantial size and two angularly disposed grooves, one on the inside and one on the outside of said disc, intersecting said orifice, the pipe at said chord having walls of greater thickness than at said circular portion.

5. In a shower device of the type having a thin disc nozzle with a threaded peripheral edge, the combination of a circular shower pipe, having a flat portion forming a chord of the circle and having a threaded aperture in said flat portion adapted to engage all of the peripheral threads on said nozzle.

6. In a shower device of the type having a thin disc nozzle with a threaded peripheral edge, the combination of a thin walled circular shower pipe of malleable metal having a flat portion forming a chord of the circle, the thickness of said flat portion being greater than the thickness of said pipe wall, and having a threaded aperture in said flat portion adapted to engage all of the peripheral threads on said nozzle.

BRUNO E. PREVOST.

REFERENCES CITED

The following references are of record in the file of this patent:

UNITED STATES PATENTS

| Number | Name | Date |
| --- | --- | --- |
| 1,972,001 | Witham, Jr., et al. | Aug. 28, 1934 |
| 2,062,779 | Congable | Dec. 1, 1936 |
| 2,283,768 | Schueler | May 19, 1942 |